Oct. 11, 1966  S. WINIKOFF  3,278,209
COUPLING MEANS FOR TUBULAR MEMBERS
Filed April 22, 1964  6 Sheets-Sheet 2
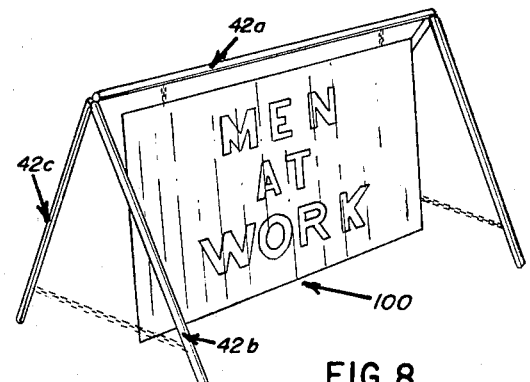
FIG 8
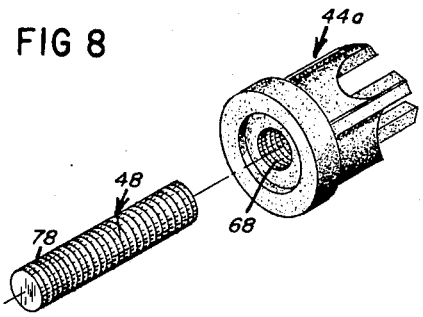
FIG 9
FIG 10
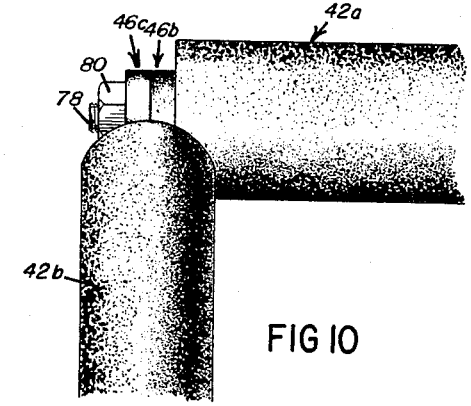
FIG 11
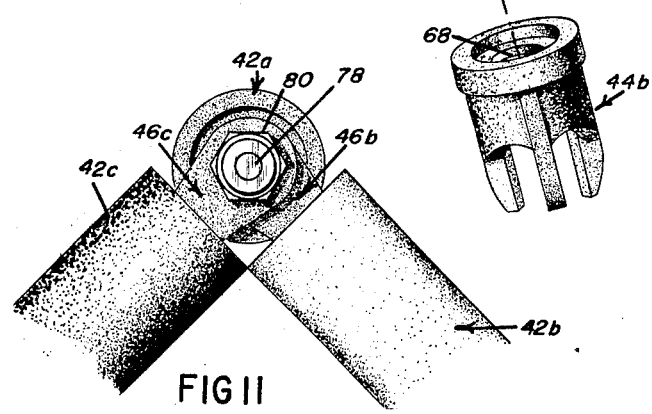
INVENTOR
Sydney Winikoff
BY
ATTORNEYS

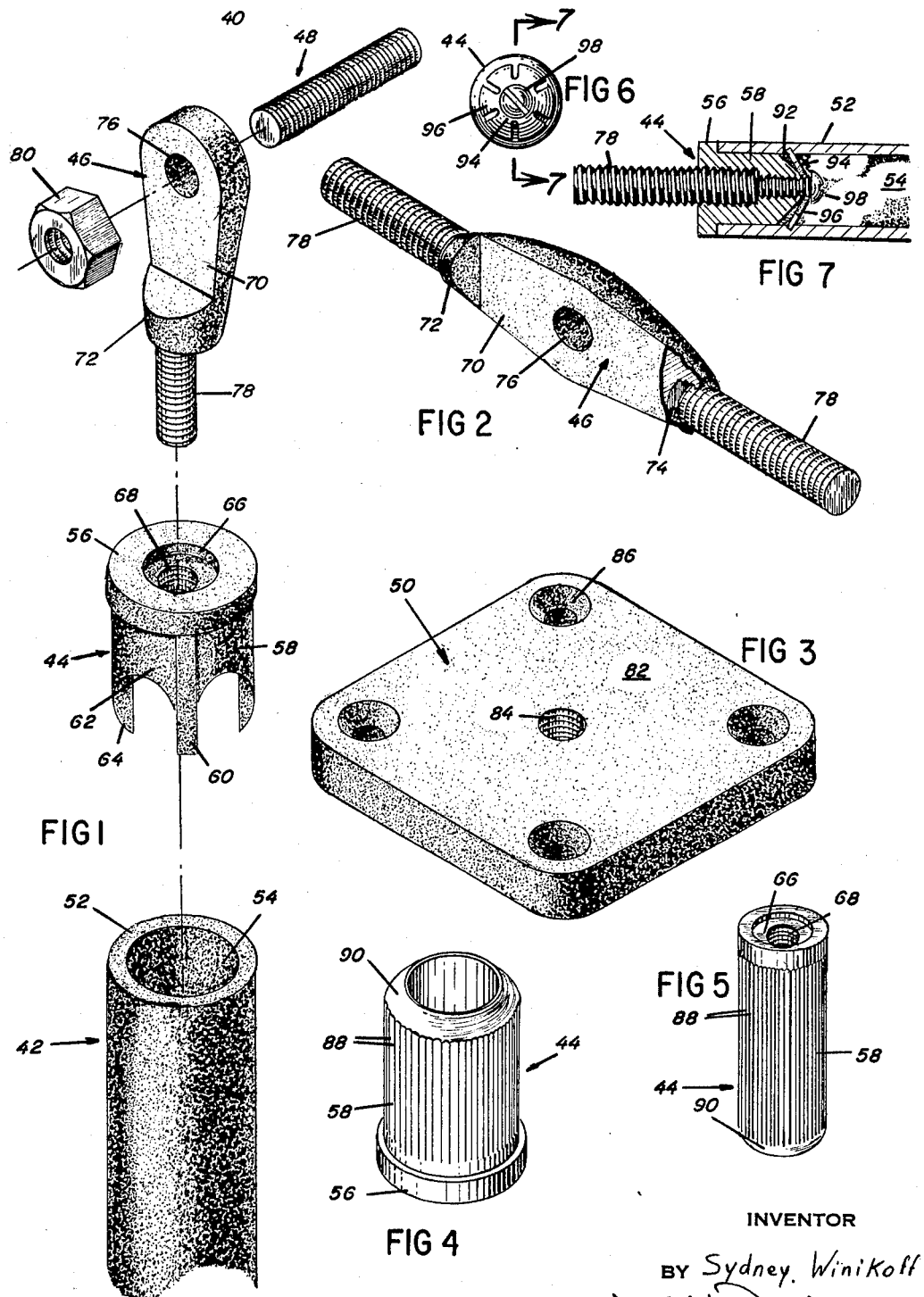

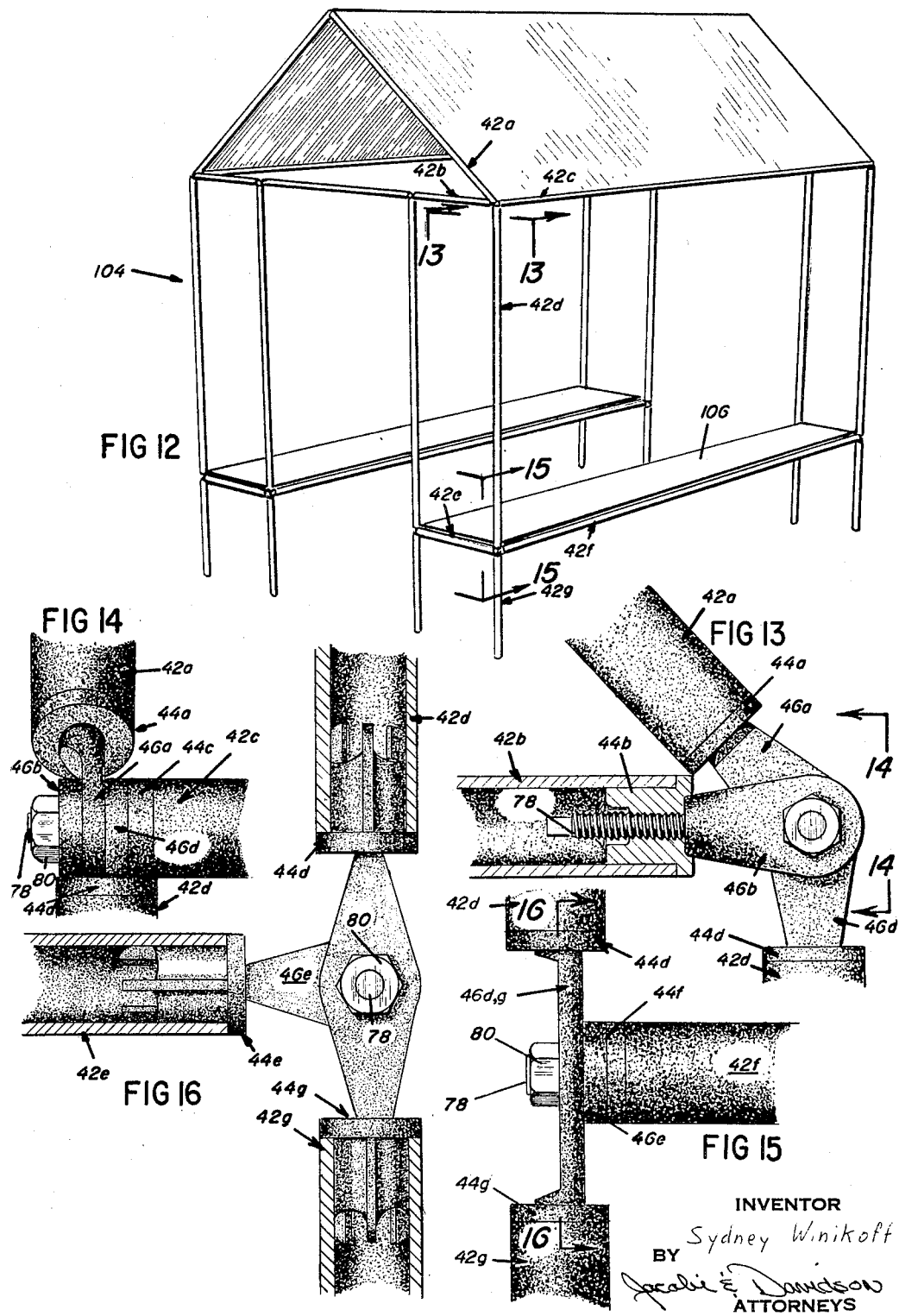

Oct. 11, 1966  S. WINIKOFF  3,278,209
COUPLING MEANS FOR TUBULAR MEMBERS
Filed April 22, 1964  6 Sheets-Sheet 4
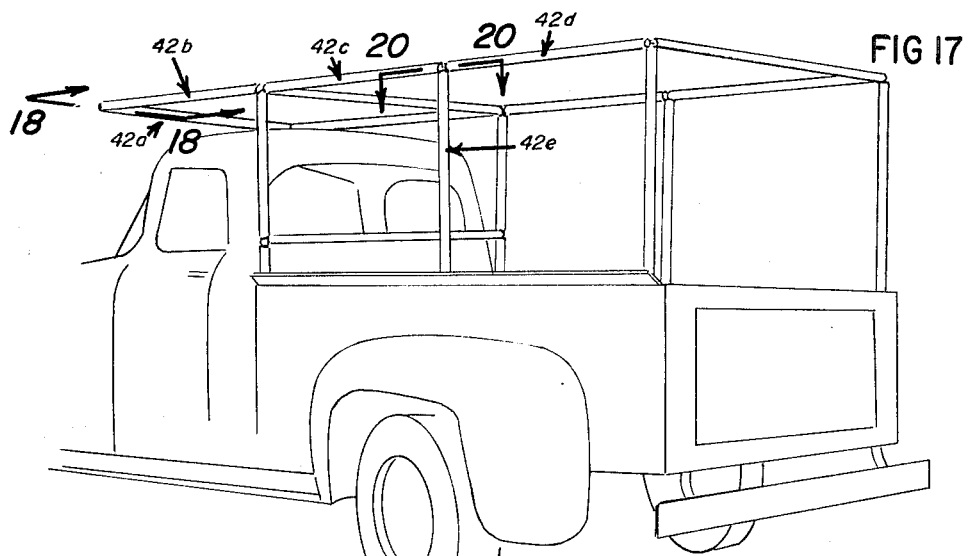
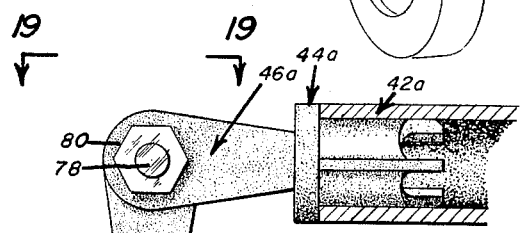
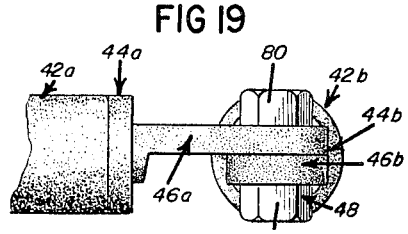
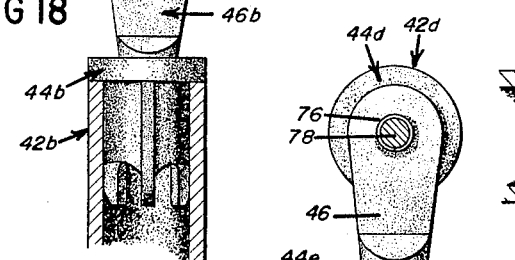
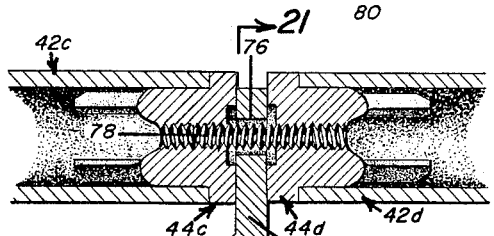
INVENTOR
Sydney Winikoff
BY Jacobi E. Davidson
ATTORNEYS

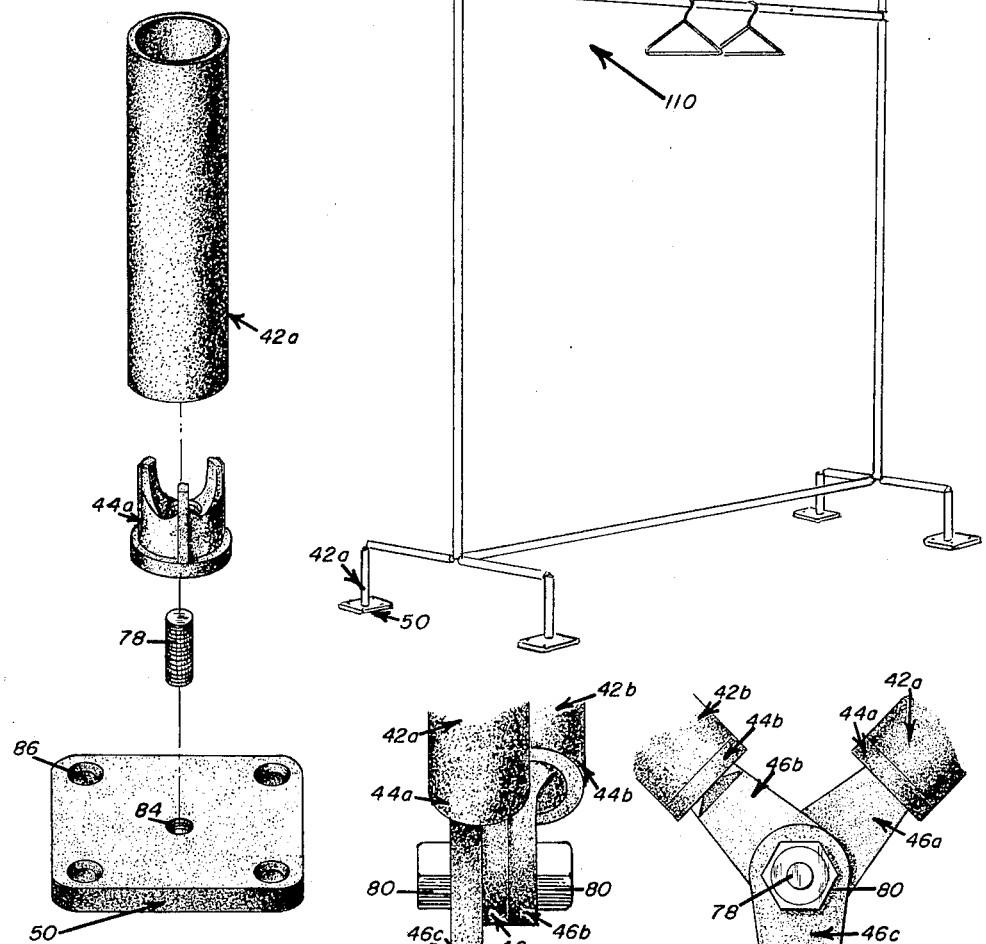

Oct. 11, 1966 S. WINIKOFF 3,278,209
COUPLING MEANS FOR TUBULAR MEMBERS
Filed April 22, 1964 6 Sheets-Sheet 6

INVENTOR
Sydney Winikoff
BY Jacobi & Davidson
ATTORNEYS

United States Patent Office 3,278,209
Patented Oct. 11, 1966

3,278,209
COUPLING MEANS FOR TUBULAR MEMBERS
Sydney Winikoff, 1435 Spring Garden Ave.,
Pittsburgh, Pa.
Filed Apr. 22, 1964, Ser. No. 361,724
7 Claims. (Cl. 287—54)

This invention relates to couplings and more particularly it relates to coupling means for interconnecting a plurality of tubular members, such as pipes or rods, to form a joint or series of joints which assemble tubular members of proper lengths at proper angles to form a fabricated structure.

For many years tubular members, such as lengths of round metal pipe, have been extremely widely used in fabricating various structures such as railings, racks, canopies, towers, supports of various types, and other similar items. Such tubular members were properly coupled to one another at joints, and there were often a large number of such joints in a single structure. One known way to form such joints was by welding the various tubular members together, but this method proved to be unpopular and generally unacceptable because it was expensive and time-consuming, because it required intricate manipulation of the members during and prior to welding, and because a structure formed with such welding joints could not be readily disassembled.

Another and far more common method of forming joints for joining tubular metal members together was to thread the ends of each member and to attach threaded fittings to these threaded ends to assemble the members in their proper angular relationship. Such fittings were generally internally threaded to receive and accommodate the threaded ends of the tubular members and were provided in such well-known forms as elbows, T's, Y's, crosses and straight sleeves. There were, however, several drawbacks in connection with such fittings. First of all, because of the infinite variety of pipe diameters and thread sizes which could be selected, it was necessary to manufacture hundreds of different sizes of each form of fitting. Secondly, such fittings were generally designed to interconnect two pipes of the same size, and if two different diameter pipes were to be interconnected, an adapter had to be employed. Thirdly, such fittings were only designed to provide ninety-degree angular connections, and if a connection at an odd angle or direction were desired, it became necessary to employ an expensive specially designed fitting. Finally, such fittings were generally difficult to produce, unwieldy to install, and bulky and unattractive in the finished structure.

Another consideration in utilizing tubing with threaded ends is the difficulty and cost in producing such threads. Naturally, the mere step of forming threads on a pipe makes the pipe more expensive and the larger the diameter of the pipe, the more expensive the task of forming the threads becomes. Moreover, although most plumbers have the facilities to thread pipes, most homeowners do not, and consequently the homeowner must purchase commercially threaded pipe and must therefore be careful to obtain exactly the desired length needed for his constructional requirements.

There is also the further consideration that it may occasionally be desirable to interconnect pipes in an adjustable joint which permits the pipe to be pivoted or otherwise moved relative to one another. In this respect, welded joints are completely lacking and so too are the conventional forms of solid fittings which thread onto the ends of the pipes. It is true that certain prior art forms of adjustable fittings have been proposed, but such fittings are quite expensive and complicated, are usually threaded onto the pipe ends, are specially manufactured for each installation, and are usually incapable of being locked into a rigid or non-adjustable joint.

With the foregoing matter clearly in mind, it is, therefore, a primary object of the present invention to overcome the shortcomings and difficulties associated with prior art couplings and fittings and to provide in their stead an improved coupling means for interconnecting tubular members such as pipes.

Another primary object of the present invention is to provide a coupling means capable of assembling a plurality of separate tubular members having different diameters and different angular spatial relationships.

Further general, though equally significant, objects of the present invention include the provision of a coupling means (a) having a minimum of parts; (b) which is durable, yet inexpensive; (c) which can be easily manipulated and quickly and conveniently installed and removed; and (d) which can be readily adjusted to permit the interconnected tubular members to extend at any angle to one another.

Other objects, advantages and salient features of the present invention will become apparent from the following detailed description, which, taken in connection with the annexed drawings, discloses a preferred embodiment thereof.

Referring to the drawings:

FIGURE 1 is an exploded perspective view of one suitable form of coupling means;

FIGURE 2 is a perspective view of an additional connector member which can be utilized in the coupling means shown in FIGURE 1;

FIGURE 3 is a perspective view of a base member which can be utilized in the coupling means shown in FIGURE 1;

FIGURES 4 and 5 are perspective views of alternate forms of plug means which can be utilized in the coupling means;

FIGURE 6 is an end view of a modified form of plug means engaged within a tubular member;

FIGURE 7 is a sectional view taken substantially along line 7—7 of FIGURE 6;

FIGURE 8 is a perspective view of a fabricated structure having joints at which three tubular members are interconnected by a coupling means in acordance with the principles of the present invention;

FIGURE 9 is an exploded perspective view of the coupling means used to form the joints in the structure of FIGURE 8;

FIGURE 10 is an enlarged fragmentary side elevational view of a joint of the FIGURE 8 structure;

FIGURE 11 is an end elevational view of the joint of FIGURE 10;

FIGURE 12 is a persepective view of a fabricated structure having several joints whereat a plurality of tubular members are interconneded by a coupling means;

FIGURE 13 is a fragmentary side elevational view partially in section, of the joint disposed substantially along the line 13—13 of FIGURE 12;

FIGURE 14 is an end elevational view taken substantially along the line 14—14 of FIGURE 13;

FIGURE 15 is a fragmentary end elevational view of the joint disposed substantially along the line 15—15 of FIGURE 12;

FIGURE 16 is a sectional view taken substantially along the line 16—16 of FIGURE 15;

FIGURE 17 is a perspective view of a fabricated structure having several joints whereat a plurality of tubular members are interconnected by a coupling means;

FIGURE 18 is a fragmentary sectional end elevational view of the joint disposed substantially along line 18—18 of FIGURE 17;

FIGURE 19 is an end view taken substantially along the line 19—19 of FIGURE 18;

FIGURE 20 is a side elevational view taken substantially along the line 20—20 of FIGURE 17;

FIGURE 21 is a sectional view taken substantially along line 21—21 of FIGURE 20;

FIGURE 22 is a perspective view of a fabricated structure having several joints whereat a plurality of tubular members are interconnected by a coupling means;

FIGURE 23 is an exploded perspective view of a coupling means used in a joint at the base of the structure of FIGURE 22;

FIGURE 24 is an end elevational view of a modified form of coupling means employing a base member;

FIGURE 25 is a side elevational view of the coupling means of FIGURE 24;

Figure 26:
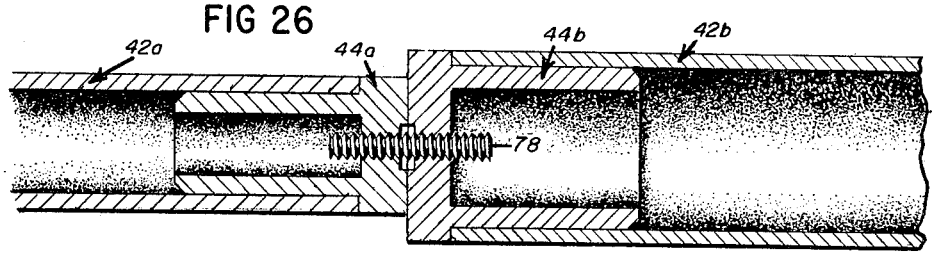
FIGURE 26 is a sectional view of a coupling means for linearly coupling tubular members of diverse diameters.

In accordance with the principles of the present invention and as can be seen generally from the figures thereof, there is provided a coupling means generally designated 40 which functions to interconnected tubular members generally designated 42. The coupling means may include all of some of the following elements and may include such elements either singly or pluraly: plug means generally designated 44, a connector member generally designated 46, a bolt or stud means generally designated 48, and a base member generally designated 50.

Referring now to FIGURE 1, the coupling means 40 is shown in an exploded view to more fully illustrate its component parts. The tubular member 42 which is to be coupled consists of a hollow cylindrical length of pipe having a circular cross-sectional wall 52 and internal cylindrical bore 54. It should be noted that the pipe wall 52 need not be either internally or externally threaded. A plug means 44 is designed to be driven into the bore 54 and frictionally retained therein. The plug means includes an enlarged head portion 56 having the same diameter as that of the tubular member 42 and a reduced diameter shank portion 58 designed to frictionally fit within the bore 54. The shank portion includes a series of spaced raised lands 60 extending axially along the shank portion and a series of webs 62 interconnecting adjacent lands 60 but terminating short of their lower ends. The lower depending ends of the lands 60 are tapered or contoured inwardly, as shown at 64, to assure their ready reception within the pipe bore 54.

The head portion 56 is provided with a central countersink 66 and within that countersink, a threaded aperture 68 is disposed. To assemble the plug means 44 with a tubular member 42, the shank portion 58 is juxtaposed to the bore 54 with its tapered lower portion 64 extending thereinto.

The head portion 56 is then struck with a hammer or other suitable instrument until the shank portion moves fully into the bore and the underside of the head portion 56 rests against the end of the pipe wall 52. The lands 60 frictionally engage the walls of the bore to assure that the plug means 44 will be firmly retained within the tubular member. The countersink 66 assures that the threads at the end of the aperture 68 will not be damaged or distorted by hammering during installation of the plug means. The countersink also provide a recess for receiving the end portion of a connector member in a manner to be presently shown and described.

The connector member 46 includes a generally flat body portion 70 and an enlarged end portion 72 at one end of the body portion, as shown in FIGURE 1, or at both ends of the body portion, as shown in FIGURE 2. The end portion 72 has a rounded configuartion to permit it to fit into the countersink 66 in the plug means. Each end portion 72 is provided with a threaded aperture 74 of the same thread size and diameter as the aperture 68 in the plug means. An unthreaded aperture 76 extends through the body portion 70 and has substantially the same diameter as the apertures 68 and 74.

The bolt means 48 is preferably formed as a threaded stud 78 having a thread size and diameter compatible with the threaded apertures 68 and 74. The stud 78 can thread into the apertures 74 in the connector plate end portions 72, as shown in FIGURES 1 and 2, and can also thread into the plug means aperture 68 to thus couple the connector member 46 to the plug means 44 and hence to the tubular member 42. The stud 78 can also extend through the body portion aperture 76 in the connector plate. An internally threaded nut 80 may be secured to either end of the stud 78 to permit it to function as a bolt. Alternatively, in certain instances a conventional bolt will function equally as well as the stud and nut combination, but the latter is preferred since it keeps to a minimum the number of separate parts needed in the coupling means 40.

The final element of the coupling means 40 is a base member 50, as shown in FIGURE 3, which may be used to mount a coupled series of tubes to a base, to a wall, or to the ground. The base member is formed of a flat plate 82 having a central threaded aperture 84 which is capable of accommodating a stud 78. A series of spaced bolt holes 86 may be disposed about the periphery of the plate 82 to permit it to be mounted by screws or bolts to a suitable wall or base.

The aforementioned elements comprise the entire coupling means 40. Of course, for any given joint, several of one element may be employed and another element may be omitted entirely, but with these previously described elements, any suitable joint may be constructed. One of the outstanding features of the present invention is that so many varied assemblies can be formed with so few different types of parts. To make a commercially acceptable coupling kit having universal adaptability, it is necessary only to vary the diameter of the plugs and the length of the studs. For example, pipes or tubular members of four different sizes can be interconnected and assembled only by providing the basic parts plus plug means 44 having the four different diameters, such as ½", 1" and 1¼". It may also be helpful to provide two or three different lengths of the studs 78, such as ⅞", 1¼" and 1½".

It is, of course, possible to vary certain details of the separate parts of the coupling means 40. For instance, in FIGURE 4, the shank portion 58 of the plug means 44 is formed as a continuous cylindrical wall having a plurality of flutes 88 extending axially therealong. The inner end of the shank portion is beveled at 90 to facilitate insertion of the plug into a bore 54 wherein it is frictionally retained by interaction between the flutes and the bore wall. In the plug means shown in FIGURE 5, the shank portion 58 is also fluted or knurled at 88, but the enlarged head portion 56 is omitted so that the entire plug may be driven into a pipe bore and spaced inwardly from the pipe end.

In the plug means 44 shown in FIGURES 6 and 7, the inner end of the shank portion is beveled to a frusto-conical tapered wall 92 and at the end of this wall, a spring steel disc 94 having a plurality of spring fingers 96 is retained by means of a screw 98 extending through the disc and into the plug means. When the screw 98 is tightened, it presses against the disc 94 and causes the spring fingers to extend or project outwardly and away from the wall 92. When the plug means is driven into the tubular member bore 54, the fingers are deformed back into contact with the wall 92 during the insertion operation, but once the plug means has been fully seated, any attempt to retract it causes the fingers 96 to bite into the walls 52 and prevent such retraction. This type of plug means is particularly useful with aluminum tubing.

Turning now to some of the structures which may be fabricated by using tubular members interconnected by the coupling means 40 of the present invention, FIGURE 8 shows a street sign generally designated 100 having its framework formed of a horizontal tubular member 42a supported at each of its ends by angled upright tubular members 42b and 42c. To interconnect these members, the coupling means 40 must form an adjustable elbow having a side outlet. As shown in the exploded view of FIGURE 9, a friction plug 44a, 44b and 44c is adapted to be inserted respectively into the tubular members 42a, 42b and 42c. A single-ended connector member 46b has a stud 78 extending from its end and adapted to be threaded into the threaded aperture 68 in the plug 44b. Similarly, a single-ended connector member 46c has a stud 78 extending from its end and adapted to be threaded into the threaded aperture 68 in the plug 44c. When the body portion apertures 76 in the connector members 46b and 46c are brought into alignment, a bolt means 48 in the form of a stud 78 is passed therethrough and at one end is threaded into the threaded aperture 68 in the plug 44a. A nut 80 is applied to the other end of the stud 78, and when this nut is tightened, it forms the compact and efficient joint shown in FIGURES 10 and 11.

It will be noted that, before the nut 80 is tightened, the tubular members 42b and 42c are pivotable with respect to one another. To prevent such pivoting after tightening of the nut 80 and to assure that the members 42b and 42c will remain locked at the proper preselected angle, a plurality of spaced raised protrusions 102 may be formed on one surface of the connector member body portion surrounding the aperture 76. When the protrusions on one body portion mate with spaces between protrusions on the adjacent body portion and the nut 80 is tightened, the interaction of the protrusions assures that no pivotal movement of the members can occur unless the nut is once again loosened.

FIGURE 12 illustrates a gazebo or garden house generally designated 104 which can be fabricated by using tubular members interconnected by the coupling means 40 of the present invention. At a corner joint where the roof is joined to the upright supports, four tubular members 42a, 42b, 42c and 42d are interconnected by a coupling in the form of a double adjustable T with one side outlet. A plug means 44a, 44b, 44c and 44d is driven respectively into the ends of the tubular members 42a, 42b, 42c and 42d, as can be seen from FIGURES 13 and 14. Single ended connector members 46a, 46b and 46d are secured to their respective associated plugs by means of studs 78 threaded between each end portion threaded aperture and its aligned plug threaded aperture. It will be noted that each end portion extends fully into the plug countersink 66 and seats upon the bottom thereof. When the body portion apertures 76 in the connector members 46a, 46b and 46d are aligned, a stud 78 with a nut 80 on its outer end is passed therethrough, and the inner end of this stud is secured within the threaded aperture in the plug means 44c.

At a corner joint where a seat or bench 106 is joined to an upright support, four tubular members 42d, 42e, 42f and 42g are interconnected by a coupling in the form of an adjustable elbow with two side outlets, as shown in FIGURES 15 and 16. Plug means 44d, 44e, 44f and 44g are provided respectively in the ends of the tubular members 42d, 42e, 42f and 42g. A single-ended connector member 46e is connected to the plug 44e by a stud 78 which passes between the threaded apertures in the plug and the end portion. A double-ended connector member 46dg is connected between the tubular members 42d and 42g, with each end of the connector member being secured to the threaded aperture in its associated plug by means of a stud 78. The body portion apertures 76 in the connector members 42dg and 42e are brought into alignment and a stud 78 having a nut 80 on its outer end is passed through the aligned apertures to permit its inner end to thread into the threaded aperture in the plug means 44f. In this manner, four tubular members are suitably interconnected through the use of only two connector members.

In FIGURE 17, a truck rack generally designated 108 is formed by interconnecting several tubular members 42 by various forms of coupling means 40. At the forward corner of the rack, two tubular members 42a and 42b are interconnected by a coupling means in the form of a 90° elbow. As shown in FIGURES 18 and 19, plug means 44a and 44b are inserted in the ends of the tubular members 42a and 42b respectively. A single-ended connector plate 46a is secured to the plug means 44a in the previously described manner and similarly a connector plate 46b is secured to the plug means 44b. The body portion apertures 76 in the connector members 46a and 46b are aligned and a bolt means 48 extends through them, the bolt means taking the form of a stud 78 with a nut 80 at each end.

Where the rack side tubular members 42c and 42d join an upright tubular member 42e, a coupling means in the form of a T is used, as shown in FIGURES 20 and 21. Plug means 44c, 44d and 44e are inserted in the ends of the tubular members 42c, 42d and 42e respectively. A single-ended connector member 46 is secured to the plug means 44e by a stud 78 extended between the end portion threaded aperture and the plug threaded aperture. Another stud 78 extends through the aperture 76 in the connector plate body portion with one end of the stud threading into the plug 44c and the other end of the stud threading into the plug 44d. The head portions of the plugs 44c and 44d abut against opposite surfaces of the connector plate body portion and thus the three tubular members are interconnected with the use of only one connector plate and two studs.

To illustrate the use of the base member, a clothing rack generally designated 110 is shown in FIGURE 22 having short lower legs 42a designed to rest upon the floor. However, if it is desired to make the rack more sturdy or if it is desired to mount it to the floor, a base member 50 is attached to the underside of the leg 42a, as shown in FIGURE 23. To this end, a plug means 44a is driven into the tubular member 42a and a stud 78 is connected between the plug means threaded aperture and the base member threaded aperture 84, thus connecting the base member 50 to the leg 42a. If desired, screws or bolts, not shown, can be inserted into the floor through the base plate bolt holes 86 to firmly mount the rack 110 and prevent it from moving.

The base member 50 can also be used to support various conventional couplings as shown in FIGURES 24 and 25 wherein it supports two tubular members coupled by a 90° elbow. The tubular member 42a has a plug means 44a inserted therein and a single-ended connector member 46a secured thereto. Similarly, the tubular member 42b has a plug means 44b inserted therein and a single-ended connector member 46b secured thereto. A third connector single-ended member 46c is secured to the base member 50 by means of a stud 78 extending between its end portion and the base member threaded aperture 84. If the stud 78 is too long, a nut 80 may be interposed between the base and connector members, as shown. The body portion apertures 76 in the connector members 46a, 46b and 46c are aligned and a stud 78 is extended therethrough. Nuts 80 are attached to opposite ends of the stud, thus interconnecting all of the various members.

The coupling means of the present invention can also be employed to linearly connect tubular members of the same or of diverse diameters. In FIGURE 26, a smaller diameter tubular member 42a has an end plug 44a and a larger diameter tubular member 42b has an end plug 44b. The head portion of the end plugs are abutted against one another and a stud 78 is passed through each threaded plug aperture. This draws the plug means 42a and 42b into contact with one another and thus couples or interconnects the two aligned tubular members. The friction plugs shown in FIGURE 26 are of the FIGURE 4 modification.

Figures 27, 29:
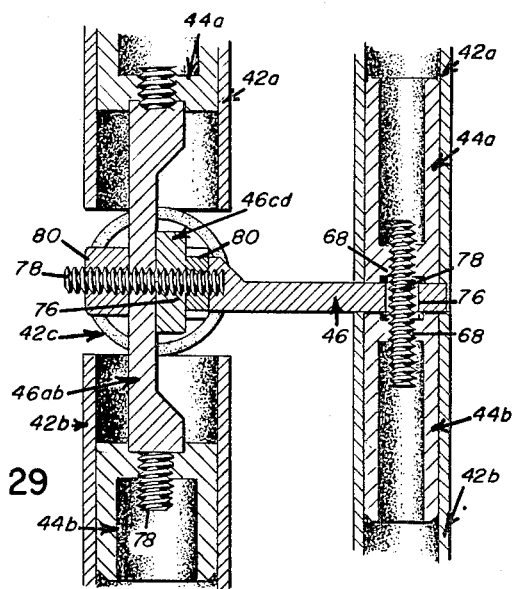
FIGURE 27 is a sectional view of a coupling means formed by interposing a connector member between a pair of linearly interconnected tubular members.
FIGURE 29 is a sectional view taken along line 29—29 of FIGURE 28.

In FIGURE 27, the two aligned tubular members 42a and 42b have the same diameter. A plug means of the FIGURE 5 modification is inserted in each of these members. It would, of course, be possible to fully interconnect these members so that the end of the member 42a would abut against the end of the member 42b, but it is also possible to connect some further member or members using this type of coupling. Therefore, FIGURE 27 shows a connector member 46 having its body portion interposed between the two tubular members by having its aperture 76 aligned with the plug means threaded apertures 68. Thus, a stud 78 extends through all of the aligned apertures and the connector member 46 is thereby suitably mounted to permit some further member to be connected at its end portion, not shown.

Figure 28:
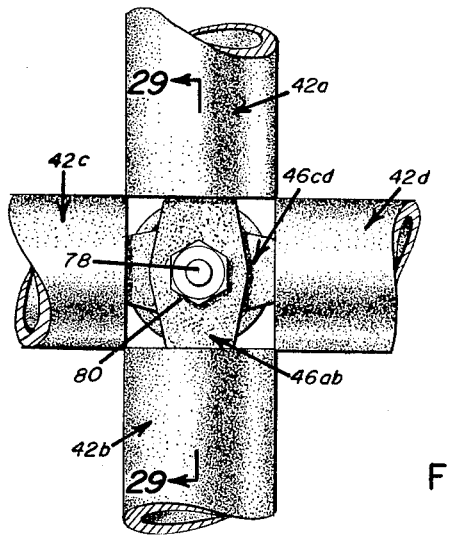
FIGURE 28 is a top plan of a coupling means interconnecting four tubular members to form a cross.

FIGURES 28 and 29 illustrate how four tubular members 42a, 42b, 42c and 42d can be interconnected in a cross joint which is extremely compact and which actually permits the ends of the tubular members to abut against one another. The plug means used is of the FIGURE 5 variety and each plug is driven within its associated tube, a short distance inward from the tube end. A first double-ended connector member 46ab extends between the tubular members 44a and 44b, with each end portion of the connector member being connected to its associated plug means by a stud 78. Similarly, a second double-ended connector member 46cd extends between the tubular members 46c and 46d, with each end portion of the connector member being connected to its associated plug means by a stud 78. When the body portion apertures 76 of the connector members are brought into alignment, a stud 78 is passed therethrough and nuts 80 are applied to its outer ends.

Figure 30:
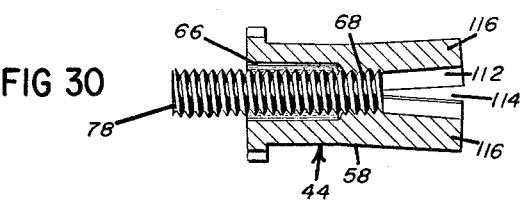
FIGURE 30 is a sectional view of a modified form of plug means.

The plug means 44 can also be of a modified construction as shown in FIGURE 30 wherein the shank portion 58 is slightly smaller than the bore of the tube in which the plug is to be inserted. The countersink 66 is somewhat deeper than that on the other plugs and the threaded aperture 68 extends from it and merges into a small bore 112 which extends to the bottom of the shank portion. The shank portion is split at 114 along the walls of the bore 112 to form several legs 116. When the plug is inserted within a tube bore, and a stud 78 is threaded into the apertures 68, the end of the stud enters the bore 112 and causes the legs 116 to spread at the splits 114 and move into frictional engagement with the tube walls.

It should be obvious that the previously described couplings represent only a very small and illustrative number of the great variety of fittings which can be formed by using the elements of the present invention. By properly varying the number and position of the coupling elements used, an almost infinite variety of alternative joints can be formed.

After reading the foregoing detailed description, it should be apparent that the objects set forth at the outset of this specification have been successfully achieved. Accordingly, what is claimed is:

1. In combination, a plurality of elongated tubular members, each having a terminal end, each tubular member being provided, at least at one of its ends, with a plug having an axially extending threaded opening, means extending radially from the exterior of each plug and cooperating with the interior of its associated tubular member to effect a frictional force fit therewith, a first stud threaded at one end secured in the threaded opening of one of said plugs, a first connector member having at least one end portion provided with a second stud threaded at one end and a body portion provided with a generally flat surface having an aperture therethrough, said flat surface lying in a plane passing substantially through the axis of said second stud, a second connector member having at least one end portion provided with a threaded stud and a body portion having a generally flat surface with an aperture therethrough, said last mentioned flat surface lying in a plane passing substantially through the axis of said last mentioned studs, said first connector member and said second connector member being mounted on said first mentioned threaded stud with said flat surfaces of said body portions in abutting relationship and with the threaded opening in said one plug, the aperture in said first connector member and the aperture in said second connector member all in axial alignment, a nut on said first mentioned threaded stud associated with said one plug securing said first and second connector members to said one plug and said other threaded plugs being secured to the threaded studs associated with the first and second connector members, whereby any load applied to the connector members will be transmitted substantially axially of their respective studs.

2. The combination defined in claim 1 wherein the radially extending means constitutes a plurality of spaced raised lands extending parallel to the axis of the plug and wherein said plug has a countersunk portion surrounding said threaded opening.

3. The combination defined in claim 2 wherein said plug is provided with an enlarged head in engagement with the end of its associated tubular member, and wherein a tubular portion is provided adjacent the enlarged head, said lands extending along and beyond said tubular portion.

4. The combination defined in claim 3 wherein the ends of the lands are tapered inwardly.

5. The combination defined in claim 1 wherein said plug is provided with a countersunk portion surrounding said threaded opening and wherein said connection member associated therewith has its end portion adjacent the threaded stud shaped to mate with the countersunk portion and to abut the bottom of said countersunk portion.

6. The combination defined in claim 5 wherein said plug is dimensioned to be received entirely within the confines of its associated tubular member.

7. The combination defined in claim 1 wherein said friction means includes a plurality of spring fingers attached at one end of the plug and extending angularly outwardly and into contact with its associated tubular member.

References Cited by the Examiner

UNITED STATES PATENTS

| | | | |
|---|---|---|---|
| 2,233,901 | 3/1941 | Scacchetti | 287—14 X |
| 2,281,220 | 4/1942 | Anderson. | |
| 2,410,088 | 10/1946 | Lundquist | 287—99 |
| 2,495,632 | 1/1950 | Hansen et al. | 211—182 X |
| 2,557,604 | 6/1951 | Invidiato | 287—99 |
| 2,703,724 | 3/1955 | Der Yuen et al. | |
| 3,085,692 | 4/1963 | Lowe | 211—182 |
| 3,089,716 | 5/1963 | Berkowitz. | |

FOREIGN PATENTS

| | | |
|---|---|---|
| 686,152 | 1/1953 | Great Britain. |
| 90,082 | 8/1937 | Sweden. |

CARL W. TOMLIN, *Primary Examiner.*

I. B. TALTON, D. W. AROLA, *Assistant Examiners.*